United States Patent [19]

Whitehead

[11] 4,260,220
[45] Apr. 7, 1981

[54] PRISM LIGHT GUIDE HAVING SURFACES WHICH ARE IN OCTATURE

[75] Inventor: Lorne A. Whitehead, Vancouver, Canada

[73] Assignee: Canadian Patents and Development Limited, Ottawa, Canada

[21] Appl. No.: 48,791

[22] Filed: Jun. 15, 1979

[51] Int. Cl.³ .............................. G02B 5/14
[52] U.S. Cl. .................. 350/96.28; 350/96.32; 350/102; 350/286
[58] Field of Search .............. 350/96.10, 96.28, 96.29, 350/96.30, 96.32, 102, 103, 259, 262, 265, 286

[56] References Cited

U.S. PATENT DOCUMENTS

| 247,229 | 9/1881 | Wheeler | 350/96.10 X |
| 2,362,175 | 11/1944 | Swanson | 350/96.10 X |
| 3,110,816 | 11/1963 | Kaisler et al. | 350/96.10 X |
| 3,196,738 | 7/1965 | Hicks, Jr. | 350/96.29 |
| 3,506,331 | 4/1970 | Kompfner | 350/96.30 X |
| 3,536,434 | 10/1970 | Frank | 350/96.28 X |
| 3,536,558 | 10/1970 | Lipkins | 350/96.28 X |
| 3,583,786 | 6/1971 | Marcatili | 350/96.32 |
| 3,700,900 | 10/1972 | Herleikson | 350/96.32 X |
| 3,740,112 | 6/1973 | Lundgren | 350/96.28 |
| 4,045,133 | 8/1977 | Carlson | 350/96.28 X |

FOREIGN PATENT DOCUMENTS

2237820 2/1974 Fed. Rep. of Germany ........ 350/96.30

OTHER PUBLICATIONS

Laakmann et al., "Waveguides: Characteristic Modes of Hollow ...", *Appl. Optics*, vol. 14, No. 5, May 1976, pp. 1334–1340.

*Primary Examiner*—John K. Corbin
*Assistant Examiner*—John D. Lee
*Attorney, Agent, or Firm*—Edward Rymek

[57] ABSTRACT

The prism light guide is a longitudinal hollow structure made of transparent dielectric material. The structure has substantially planar inner and outer surfaces which are in "octature". The hollow structure is formed of one or more longitudinal sections which may be bonded together with an adhesive having a refractive index similar to the refractive index of the sections. The cross-section of each section is preferably constant along the length of the section, and the surfaces in each section are flat and polished smooth. One preferred light guide includes a rectangular or square hollow structure made of four longitudinal wall sections bonded together. Each wall section has a planar inner surface and an outer surface having 90° angle longitudinal corrugations. The dielectric material is acrylic plastic or optically clear glass and the light guide includes an outer jacket for protecting the outer surface.

12 Claims, 11 Drawing Figures

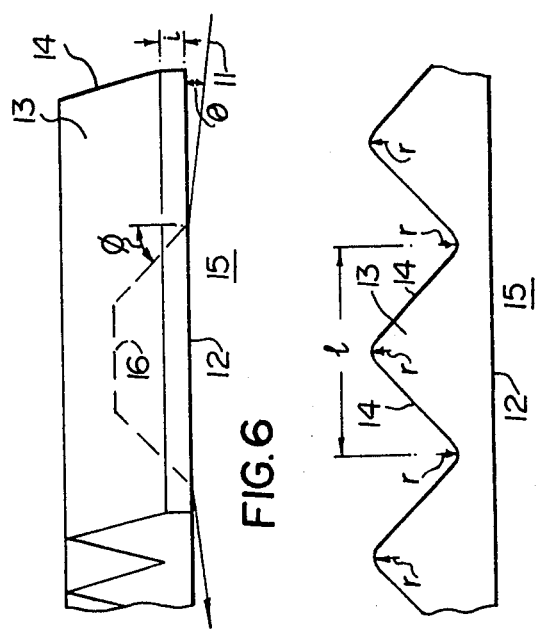
FIG.6
FIG.7
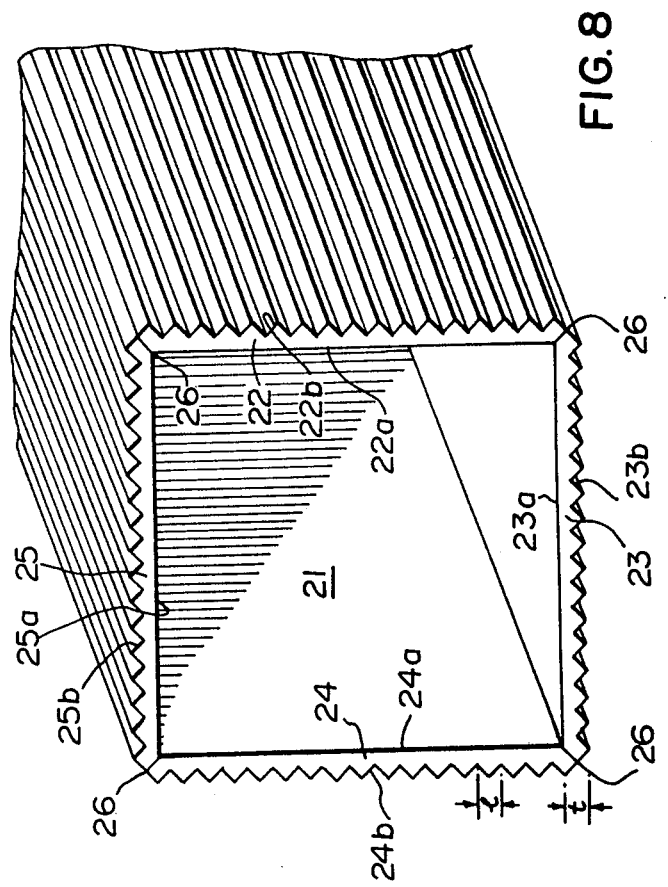
FIG.8

PRISM LIGHT GUIDE HAVING SURFACES WHICH ARE IN OCTATURE

BACKGROUND OF THE INVENTION

This invention is directed to a light guide, and in particular to a light guide for transmitting large quantities of light energy from one place to another.

As exemplified by U.S. Pat. No. 247,229, which issued to W. Wheeler on Sept. 20, 1881, the illumination of entire buildings by a central lighting system has long been desired because of its many advantages. For example, the piping of light from a central source brings about efficiency due to the source size, and such a source may include the direct use of sun light. In addition, a central lighting system would provide cool light at its outlets with the heat being expended at the source.

Presently, there are two basic methods of guiding light energy. The first method, exemplified by U.S. Pat. No. 2,362,175 which issued to H. Swanson on Nov. 7, 1944, is to employ a dielectric waveguide, which is a solid rod made of transparent material. The light rays are reflected inward by the surface of the rod in a process known as total internal reflection. This process is nearly 100% efficient in containing the light, but unfortunately all reasonably priced transparent materials actually absorb most of the light in relatively short distances, i.e. within a few centimeters to a few meters. The method is therefore used mainly in optical communications systems, where small quantities of extremely expensive dielectric material are used.

The second technique is to have the light propogate mainly through air, and to periodically redirect the light to keep it confined and travelling in the correct direction. Until now there have been three methods of accomplishing this redirection. A first method, as exemplified by U.S. Pat. No. 3,506,331 which issued to R. Kompfner on Apr. 14, 1970, is to use focussing lenses or mirrors at intervals down a hollow pipe. In a second method, a hollow pipe with a mirrored inner surface is used to keep the light travelling down the pipe, such a pipe is shown in U.S. Pat. No. 3,700,900 which issued to J. A. Herleikson on Oct. 22, 1972. In a third method which is illustrated in U.S. Pat. No. 3,583,786 issued to E. A. J. Marcatili on June 8, 1971, the pipe consists of an inner cylinder, usually air, surrounded by pairs of dielectric layers wherein the losses are purported to decrease with the number of pairs of layers.

SUMMARY OF THE INVENTION

It is therefore an object of this invention to provide a light guide for transmitting light.

It is a further object of this invention to provide an efficient light guide for a central lighting system.

These and other objects are achieved in a light guide comprising a longitudinal hollow structure made of transparent dielectric material. The hollow structure is formed of one or more longitudinal sections with planar surfaces, the planar surfaces of each section having an angular relationship with one another which is defined as being in octature. The longitudinal sections may be bonded together with an adhesive having a refractive index similar to the refractive index of the sections themselves.

It is preferred that the cross-section of each section be constant along the length of the section, and that the surfaces be flat and polished smooth.

In one embodiment, the hollow structure is made of four longitudinal wall sections bonded to form a structure having a parallelogram cross-section, such as a rectangle or square.

Each wall section has a planar inner surface and an outer surface having 90° angle longitudinal corrugations. Each wall section may be of unitary construction or it may include a planar subsection and a number of longitudinal subsections having a trapezoid cross-section bonded to the planar subsection.

The dielectric material in this structure may be acrylic plastic or optically clear glass. The entire dielectric structure may be covered by a jacket to protect the outer surfaces of the structure.

IN THE DRAWINGS

FIG. 1 illustrates a four section guide structure;
FIG. 2 illustrates an extruded guide section;
FIG. 3 illustrates a generalized guide cross-section;
FIG. 4 illustrates a cross-section beam path in a guide;
FIGS. 5 and 6 illustrate the guide with regard to attenuation losses;
FIG. 7 illustrates the guide with regard to edge imperfection;
FIG. 8 illustrates an embodiment of a light guide in accordance with the present invention;
FIGS. 9 and 10 illustrate two wall constructions for a light guide; and
FIG. 11 illustrates an encased light guide.

DESCRIPTION OF THE PREFERRED EMBODIMENTS

The prism light guide in accordance with the present invention consists of a hollow structure through which light is guided. Dielectric materials are only used for reflecting light rays at the edge of the light guide and this reflection is produced by having the dielectric materials shaped as triangular prism corner refractive reflectors.

Figure 1:
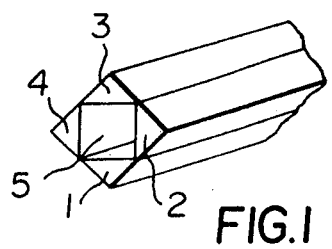
Figure 2:
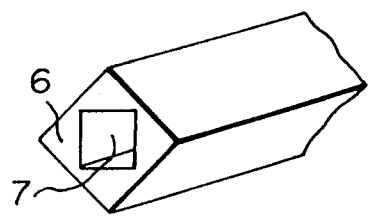

Simple guide structures are shown in FIGS. 1 and 2. In FIG. 1, the light guide is made from four longitudinal dielectric sections 1, 2, 3, and 4, each having a right isosceles triangular cross-section to form a guide having an air-space 5. The size of each of the sections relative to one another may differ or they may be substantially identical. The number of sections and their disposition may also vary from guide to guide. The guide in FIG. 2 on the other hand is formed from a single extruded hollow section 6 having air-space 7.

Light which need not be coherent or highly collimated is introduced into one end of the guide and is guided through to its other end. Maintenance of the light reflection within the guide is accomplished by the well known optical phenomena of total internal reflection as a result of the geometrical structure of the guide wall. Thus the light beam travels through the light guide mainly in the air-space 5, 7 and is reflected back into this air-space 5,7 from the surface and from within the sections 1, 2, 3 and 4 in FIG. 1 or section 6 in FIG. 2, respectively.

Figure 3:
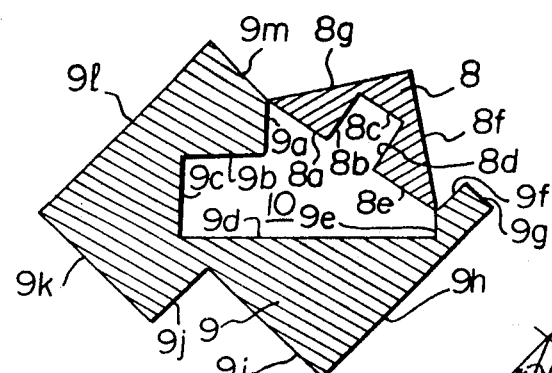

The guide has one or more sections which form the guide wall or enclosure. FIG. 3 illustrates in cross-section, a generalized guide having two different sections 8 and 9 of general shape forming a hollow guide with an air-space 10. In order that the guide be capable of effectively guiding light, it is essential that the inner surfaces and the outer surfaces of each section 8 and 9 be in "octature", though the angular relationship between the section 8 and section 9 is not critical.

The term "octature" signifies that the following three conditions are met for each section:

(1) All of the inner surfaces of a section, i.e. the surfaces of a section in the hollow air-space 10, are either perpendicular or parallel to one another. For example, surfaces 8a, 8c and 8e are parallel to one another and perpendicular to surfaces 8b, and 8d. The same holds true for inner surfaces 9a to 9e.
(2) The outer surfaces of a section are either perpendicular or parallel to one another. For example, 8f is perpendicular to 8g, and 9f, 9h, 9j and 9l are parallel to one another and perpendicular to 9g, 9i, 9k and 9m.
(3) Finally, the inner surfaces are at a 45° angle to the outer surfaces. For example, surfaces 8a, 8b, 8c, 8d and 8e are at a 45° angle to 8f and 8g. This geometrical cross-section of the guide structure enables the guide to maintain the beam within the structure by internal reflection.

Figure 4:
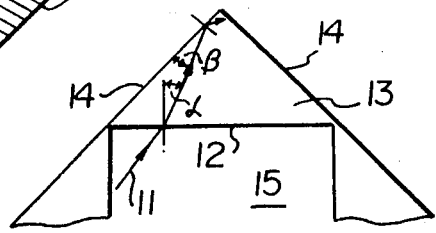

As mentioned above, the input light need not be highly collimated, however the angle $\theta$ by which any ray deviates from the guide's axial direction, as shown in FIG. 6, must be less than a predetermined angle, $\theta_{max}$, otherwise light can escape through the walls of the guide. $\theta_{max}$ is a function of the refractive index $\eta$ of the dielectric material, and may be determined as follows:

In studying the propagation of a ray in the guide, it is simplest to consider the path of a ray as it would appear if viewed "in cross section" from the axial direction, as depicted in FIG. 4. The angular relationships for refraction and total internal reflection in this representation are precisely the same as in truly 2-dimensional propagation, providing the refractive index of the dielectric material is considered to be $\eta'$, where $$\eta' = \eta \left( \frac{1 - \frac{\cos^2 \theta}{\eta^2}}{1 - \cos^2 \theta} \right)^{\frac{1}{2}}$$

It can be seen that the effect of $\theta$ being a small angle, is to make the effective refractive index, $\eta'$, very large.

At any point in a cross-sectional trajectory of a ray 11 in the dielectric, two angles, $\alpha$ and $\beta$, can be defined. $\alpha$ is the angle the ray makes with any inner face 12 of the section 13, or with the perpendicular to that inner face, whichever is less. Similarly, $\beta$ is the angle the ray makes with any outer face 14 of the section 13, or with the perpendicular to that face, whichever is less. It is easily seen that the value of $\alpha$ and $\beta$ remains unchanged for a given ray 11, no matter how many times it is partially or totally reflected in the dielectric section 13. In addition, it can be seen that $\beta = 45° - \alpha$. These two facts are a direct result of the "octature" relationship amongst the faces of the dielectric section 13.

There are two requirements which must be satisfied for the light guide to operate. First, it must be possible for a ray 11 to escape through an inner face 12 back into the air space 15. This necessitates that $$\alpha \leq \sin^{-1}\left(\frac{1}{\eta'}\right)$$

Second, it must be impossible for a ray 11 to escape through an outer face 14, i.e. it must be totally internally reflected at all outer faces. This necessitates that $$\beta \geq \sin^{-1}\left(\frac{1}{\eta'}\right)$$

The value of $\alpha$ and $\beta$ for a ray in the dielectric section depends on the direction of that ray 11 before entering the dielectric section 13, and on $\eta'$. Providing $\eta' > \sqrt{2}$, as will always be the case, it will always be true that $$\alpha \leq \sin^{-1}\left(\frac{1}{\eta'}\right)$$

Thus, all rays automatically satisfy the first requirement that they be able to escape back into the air space 15.

Employing the fact that $\beta = 45° - \alpha$, then $$\beta \geq 45° - \sin^{-1}\left(\frac{1}{\eta'}\right)$$

Thus, in order to satisfy the second requirement of total internal reflection on the outside faces, it must be true that $$45° - \sin^{-1}\left(\frac{1}{\eta'}\right) \geq \sin^{-1}\left(\frac{1}{\eta'}\right)$$

which leads to $$\eta' \geq \frac{1}{\sin (22.5°)}$$

Substituting for $\eta'$, $$\eta \left( \frac{1 - \frac{\cos^2 \theta}{\eta^2}}{1 - \cos^2 \theta} \right)^{\frac{1}{2}} \geq \frac{1}{\sin (22.5°)}$$

Solving for $\theta$, $$\theta \leq \cos^{-1}\left( \frac{1 - \eta^2 \sin^2 (22.5°)}{1 - \sin^2 (22.5°)} \right)^{\frac{1}{2}}$$

And thus $$\theta_{max} = \cos^{-1}\left( \frac{1 - \eta^2 \sin^2 (22.5°)}{1 - \sin^2 (22.5°)} \right)^{\frac{1}{2}}$$

If the refractive index of the dielectric material is 1.5, as is the case for acrylic plastic, then $\theta_{max}$ is 27.6°.

In a prism light guide in accordance with the present invention, various types of losses may occur, attenuating the beam as it travels through the guide.

Losses may be incurred by surface roughness of the sections in the waveguide, however, if the surfaces are optically smooth, these losses will be negligible. Losses due to surface curvature or cross-section variation may also be kept negligible by providing a reasonably flat surface and constant cross-section, i.e. to within approximately one wavelength over distances of several millimeters. Prism losses due to diffraction effects are negligible if the prism is very large compared to the wavelength λ of light, as will be the case in the present guides since very small prism shapes would be very difficult and expensive to manufacture.

Losses which are not negligible and which would therefore govern the size of the flat surfaces in a light guide would be the dielectric absorption loss and the prism edge imperfection loss. These losses are described referring to FIGS. 5 to 7.

Figure 5:
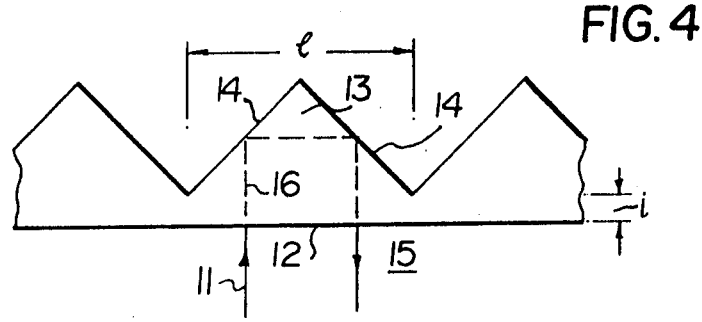

When a ray 11 of light strikes the inner surface 12 of a prism section 13 as shown in FIG. 5, the portion 16 of the ray which enters the dielectric section 13 travels an average cross-sectional distance $l+2i$ within the dielectric, $l$ being the length of the prism hypotenuse. However, the ray is also moving in the direction of the guide axis at an angle $\theta < \theta_{max}$, as shown in FIG. 6. The true average distance travelled in the dielectric will therefore be:

$$\frac{l+2i}{\cos\phi} = \frac{l+2i}{\sqrt{1-\frac{\cos\theta}{\eta^2}}} \approx \frac{l+2i}{\sqrt{1-1/\eta^2}} \text{ since } \cos\theta \approx 1.$$

where $\eta$ is the refractive index of the medium. The dielectric attenuation per reflection through the medium will therefore be $$a_d = \frac{k(l+2i)}{\sqrt{1-1/\eta^2}},$$

assuming $a_d << 1$, as will be the case, where k is the attenuation per unit length in the dielectric.

Prism 13 edge imperfections may be viewed as circular as shown in FIG. 7, the radius of the circular edge being r. The attenuation $a_e$ per passage of a ray through the prism 13 can be roughly estimated at $$a_e = \frac{4r}{l}$$

The total attenuation $a_T$ of the guide per reflection is then taken to be $a_T = a_d + a_e$, however, two corrections due to partial reflections must be applied.

Only a fraction of the light in a given ray actually enters the prism and is subsequently involved in absorption processes. This fraction is $t(\theta)$. When a light ray, originally at an angle $\theta$ from the axis, is about to emerge from a reflecting prism, a certain fraction will be partially reflected inward, to undergo a repeat of the loss processes. Let this fraction be $r'(\theta)$. By summing the geometric series for this, we have a loss enhancement factor of $$\frac{1}{1-r'(\theta)}.$$

The total corrected attenuation per traversal is therefore:

$$a_T = \frac{t(\theta)}{1-r'(\theta)} \left( \frac{4r}{l} + \frac{k(l+2i)}{\sqrt{1-1/\eta^2}} \right)$$

On examination of the fresnel equations for reflection and transmission at a dielectric interface, however, it is seen that $r'(\theta) = r(\theta)$ and hence $1 - r'(\theta) = 1 - r(\theta) = t(\theta)$, for all polarizations of the light. Thus, $$\frac{t(\theta)}{1-r'(\theta)} = 1,$$

and hence $$a_T = \left( \frac{4r}{l} + \frac{k(l+2i)}{\sqrt{1-1/\eta^2}} \right)$$

The number of traversals per unit length is clearly $$\frac{\Delta\eta}{\Delta z} = \frac{\tan\theta}{D}$$

where D is the average cross-sectional distance travelled by a ray in crossing the guide air space. If the guide air space is rectangular, with dimensions a and b, then $D = (a^{-1} + b^{-1})^{-1}$. If roughly circular with radius r, $$D = \frac{4r}{\pi}$$

Finally, if it is assumed that there is a distribution of angles $$\frac{dP}{d\theta} = W(\theta),$$

where $W(\theta) = 0$ for $\theta > \theta_{max}$, then the approximate value for the attenuation per unit length will be:

$$\frac{d \ln I}{dz} = \int_0^{\theta_{max}} W(\theta) \frac{\tan\theta}{D} \left( \frac{4r}{l} + \frac{k(l+2i)}{\sqrt{1-1/\eta^2}} \right) d\theta$$

As a reasonable approximation, it is assumed that $$W(\theta) = \frac{2}{(\theta_{max})^2} \theta \text{ s.t } \int_0^{\theta_{max}} W(\theta) d\theta = 1 \text{ and} \quad (1)$$

distribution is even in space.

$$\tan\theta \simeq \theta \quad (2)$$

Then $\frac{d \ln I}{dz} = \int_0^{\theta_{max}} \frac{2\theta}{(\theta_{max})^2} \frac{\theta}{D} \left( \frac{4r}{l} + \frac{k(l+2i)}{\sqrt{1-1/\eta^2}} \right) d\theta$ $$\therefore \frac{d \ln I}{dz} \simeq \frac{2}{3} \frac{\theta_{max}}{D} \left( \frac{4r}{l} + \frac{k(l+2i)}{\sqrt{1-1/\eta^2}} \right)$$

It is clearly advantageous to make i as small as is reasonably possible, so $i << 1$. The value for l which then minimizes $(d \ln I)/dz$ is:

$$l_{optimum} = \left( \frac{4r\sqrt{1 - 1/\eta^2}}{k} \right)^{\frac{1}{2}}$$

and therefore the attenuation per unit length for a device having $l_{opt}$ will be $$\frac{d \ln I}{dz} \simeq \frac{8}{3} \frac{\theta_{max}}{D} \left( \frac{rk}{\sqrt{1 - 1/\eta^2}} \right)^{\frac{1}{2}}$$

It is to be noted from the above equations that it is desirable to have a light guide in which the cross-section area of the dielectric is a small fraction of the total light guide cross-section. It is further to be noted that the losses vary as the square root of the loss per unit length of dielectric k and the radius of the prism edge r and weakly inversely with the refractive index $\eta$ of the dielectric.

The prism light guide in FIG. 8 illustrates an embodiment of the present invention capable of being produced on a large scale. The guide includes four wall sections 22, 23, 24 and 25 which may be made from a suitable dielectric material such as acrylic plastic or optically clear glass. The wall sections are bonded together at the corners 26 to form a hollow square guide having an air-space 21. Each section has an inner surface 22a, 23a, 24a, 25a, which are planar and outer surfaces 22b, 23b, 24b, 25b, respectively which are formed by 90° angle corrugations with faces at an angle of 45° with respect to the inner surface 22a, 23a, 24a, and 25a. The overall thickness of the wall is indicated as t and the base width of the corrugation is indicated as l.

Figure 9:
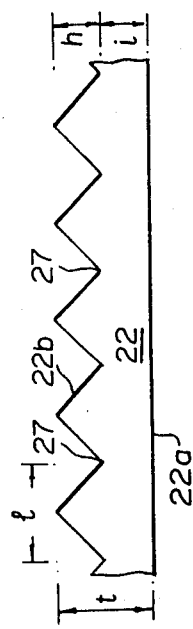
Figure 10:
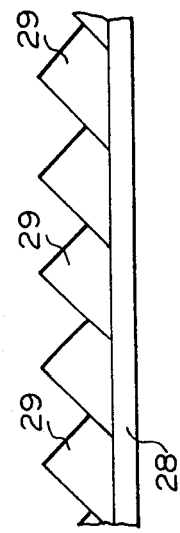

Each wall section 22, 23, 24 and 25 may be manufactured as a single unit as illustrated in FIG. 9. In the case of acrylic plastic, such a unit could be cast or molded. If polishing of the surface is necessary, as would be the case with glass dielectric, the inside corners 27 would be difficult to produce. Each wall section 22, 23, 24, and 25 may alternately be a composite as shown in FIG. 10, having a planar subsection 28 on which are bonded a number of longitudinal subsections 29 which have a cross-section in the shape of a trapezoid having angles of 90°, 90°, 135°, and 45°. All four sides of the subsections 29 as well as the two surfaces and the edges of subsection 28 must be smooth polished before they are bonded together using a transparent bond material. Any reflections from this bond material do not affect the operation of the guide as long as the internal surfaces are parallel or perpendicular to the inner or outer surfaces. In addition, the space between the bonded surfaces should be kept as small as possible, i.e. much less than the effective corner radius r.

As determined above, the base l of the corrugations in walls 22, 23, 24 and 25 will have a certain optimum value $l_{opt}$ depending on the dielectric material used. Thus, for example, if the dielectric material has a loss k of $10^{-1}$/m and a refractive index $\theta$ of 1.5, and the finished corners have effective radii of $5 \times 10^{-6}$ m, then $l_{opt}$ should be in the order of 1.05 cm. For other materials, l could range from 0.3 cm to 3 cm. The thickness t of the wall is determined in part by l since $t = h + i$, and $h = \frac{1}{2}l$, and by the strength required in the walls. Normally, t would also be in the range from 0.1 cm to 1 cm.

The overall size or cross-sectional area of the light guide will depend on the amount of optical energy to be guided since there are practical limits to the energy density of the light in the guide. The first limitation is that present light sources with the required degree of collimation yield a maximum intensity in the order to 100 w/cm². The second limitation is fire safety. In order to prevent a possible fire hazard due to a broken guide, the practical light intensity may be in the order of 10 w/cm². With these limitations on the light density, the overall cross-sectional area is made larger as the desired optical energy is increased.

As can be seen from FIG. 8, the cross-sectional area of the air-space is large compared to the cross-sectional area of the dielectric material in the walls 22, 23, 24 and 25. For example, if l is 2 cm and i is ½ cm, and there are 15 corrugations in each side wall, then the overall cross-section area of the guide will be 902 cm² and the cross-section of the dielectric will be 118 cm² or 13.7%.

Figure 11:
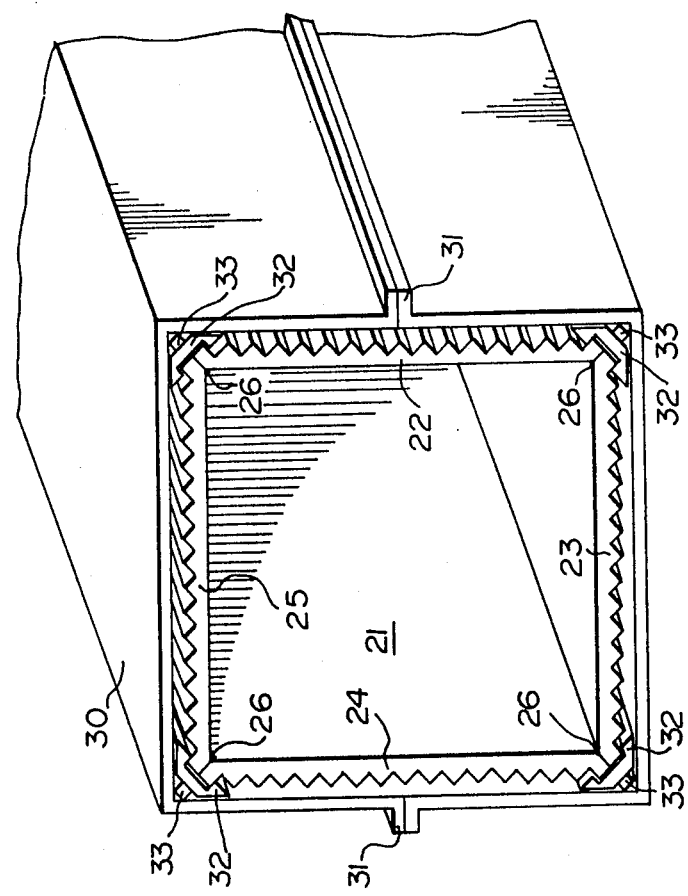

To protect the light guide from damage, the light guide may be enclosed in a protective jacket 30 as shown in FIG. 11. The protective jacket 30 may be made as a single extrusion or as two half-sections which are fixed together at joints 31 in assembly. The corners 26 of the light guide are held in the protective jacket 30 by corner strips 32 which with strip springs 33 prevent the light guide from moving within the jacket.

Although the principles of the present invention have been described with reference to particular embodiments, by way of example, it is understood that modifications may suggest themselves to those skilled in the art and it is intended that such modifications fall within the scope of the claims.

I claim:
1. A light guide comprising a longitudinal hollow structure made of transparent dielectric material, said structure having substantially planar inner and outer surfaces which are in octature.
2. A light guide as claimed in claim 1 wherein the hollow structure is formed of one or more longitudinal sections with planar surfaces, the planar surfaces of each section being in octature.
3. A light guide as claimed in claim 2 wherein the longitudinal sections are bonded together with an adhesive having a refractive index similar to the refractive index of the sections.
4. A light guide as claimed in claim 2 or 3 wherein the cross-section of each section is approximately constant along the length of the section.
5. A light guide as claimed in claim 2 or 3 wherein the surfaces in each section are polished smooth.
6. A light guide as claimed in claim 2 or 3 wherein the surfaces in each section are substantially flat.
7. A light guide as claimed in claim 2 or 3 which further includes a jacket means for protecting the outer surfaces of the structure.
8. A light guide as claimed in claim 1, 2 or 3 wherein the dielectric material is acrylic plastic or optically clear glass.
9. A light guide as claimed in claim 2 wherein the hollow structure is made of four longitudinal wall sections bonded to form a structure having a parallelogram cross-section.
10. A light guide as claimed in claim 9 wherein the wall sections are similar and the cross-section is square.
11. A light guide as claimed in claim 9 or 10 wherein each wall section has a planar inner surface and outer surface having 90° angle longitudinal corrugations.
12. A light guide as claimed in claim 9 or 10 wherein each wall section consists of a planar subsection and a number of longitudinal subsections having a trapezoid cross-section bonded to the planar subsection whereby the inner surface of the wall section is planar and the outer surface of the wall section has 90° angle longitudinal corrugations.

* * * * *